US008719407B2

(12) United States Patent
Handa

(10) Patent No.: US 8,719,407 B2
(45) Date of Patent: May 6, 2014

(54) NETWORK DEVICE, INFORMATION PROCESSING APPARATUS, CONTROL METHOD OF THE SAME, AND RECORDING MEDIUM FOR THE SAME

(75) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 13/372,273

(22) Filed: Feb. 13, 2012

(65) Prior Publication Data

US 2012/0209991 A1    Aug. 16, 2012

(30) Foreign Application Priority Data

Feb. 16, 2011    (JP) .................................. 2011-031095

(51) Int. Cl.
*G06F 15/173*    (2006.01)
*G06F 1/00*    (2006.01)

(52) U.S. Cl.
USPC .......................................... 709/224; 713/323

(58) Field of Classification Search
USPC .................... 709/223, 224; 713/323
See application file for complete search history.

(56) References Cited

U.S. PATENT DOCUMENTS

| 4,213,288 | A | * | 7/1980 | Takeuchi et al. ................ 56/11.6 |
| 4,592,051 | A | * | 5/1986 | Frizlen ........................... 370/507 |
| 5,960,059 | A | * | 9/1999 | Geck ........................... 379/10.01 |
| 6,415,387 | B1 | * | 7/2002 | Aguilar et al. ................. 713/320 |
| 6,795,450 | B1 | * | 9/2004 | Mills et al. ..................... 370/463 |
| 6,883,016 | B1 | * | 4/2005 | Fujii et al. ..................... 709/203 |
| 7,600,137 | B2 | * | 10/2009 | Trappeniers et al. ......... 713/310 |
| 7,742,179 | B2 | * | 6/2010 | Ikeda ........................... 358/1.14 |
| 2006/0075269 | A1 | * | 4/2006 | Liong et al. ................... 713/300 |
| 2007/0106723 | A1 | * | 5/2007 | Nakamura et al. ............ 709/203 |
| 2008/0298770 | A1 | * | 12/2008 | Noguchi ......................... 386/95 |
| 2010/0205312 | A1 | * | 8/2010 | Yasuma ........................ 709/228 |

FOREIGN PATENT DOCUMENTS

| JP | 2005-175625 A | 6/2005 |
| JP | 2008-18596 A | 1/2008 |
| JP | 2009-205267 A | 9/2009 |

* cited by examiner

*Primary Examiner* — Lance L Barry
(74) *Attorney, Agent, or Firm* — Canon U.S.A., Inc., IP Division

(57) ABSTRACT

A network device communicating with an information processing apparatus includes a receiving unit configured to receive an activation request from the information processing apparatus, an activation unit configured to activate the device in response to the activation request, a notification unit configured to provide notification of a first scheduled time indicating a duration time of a state in which the device is not activated, and a responding unit configured to, in response to the activation request received after the notification unit is notified of the first scheduled time, provide notification of a second scheduled time indicating a duration time of the state in which the device is not activated between when the first scheduled time is notified and before a time corresponding to the first scheduled time elapses, and when the activation has been completed, to notify the information processing apparatus of the completed activation.

6 Claims, 10 Drawing Sheets

FIG. 2A

```
100
NOTIFY *HTTP/1.1
HOST: 239.255.255.250:1900
CACHE-CONTROL: max-age=1800
LOCATION: http://192.168.1.1
NT: upnp:rootdevice
NTS: ssdp:alive ～101
USN: uuid:12345678-1234-1234-1234-123456789012::upnp:rootdevice
```

FIG. 2B

```
200
NOTIFY *HTTP/1.1
HOST: 239.255.255.250:1900
NT: upnp:rootdevice
NTS: ssdp:byebye ～201
USN: uuid:12345678-1234-1234-1234-123456789012::upnp:rootdevice
Powerstate:2 ～202
SleepPeriod:120 ～203
```

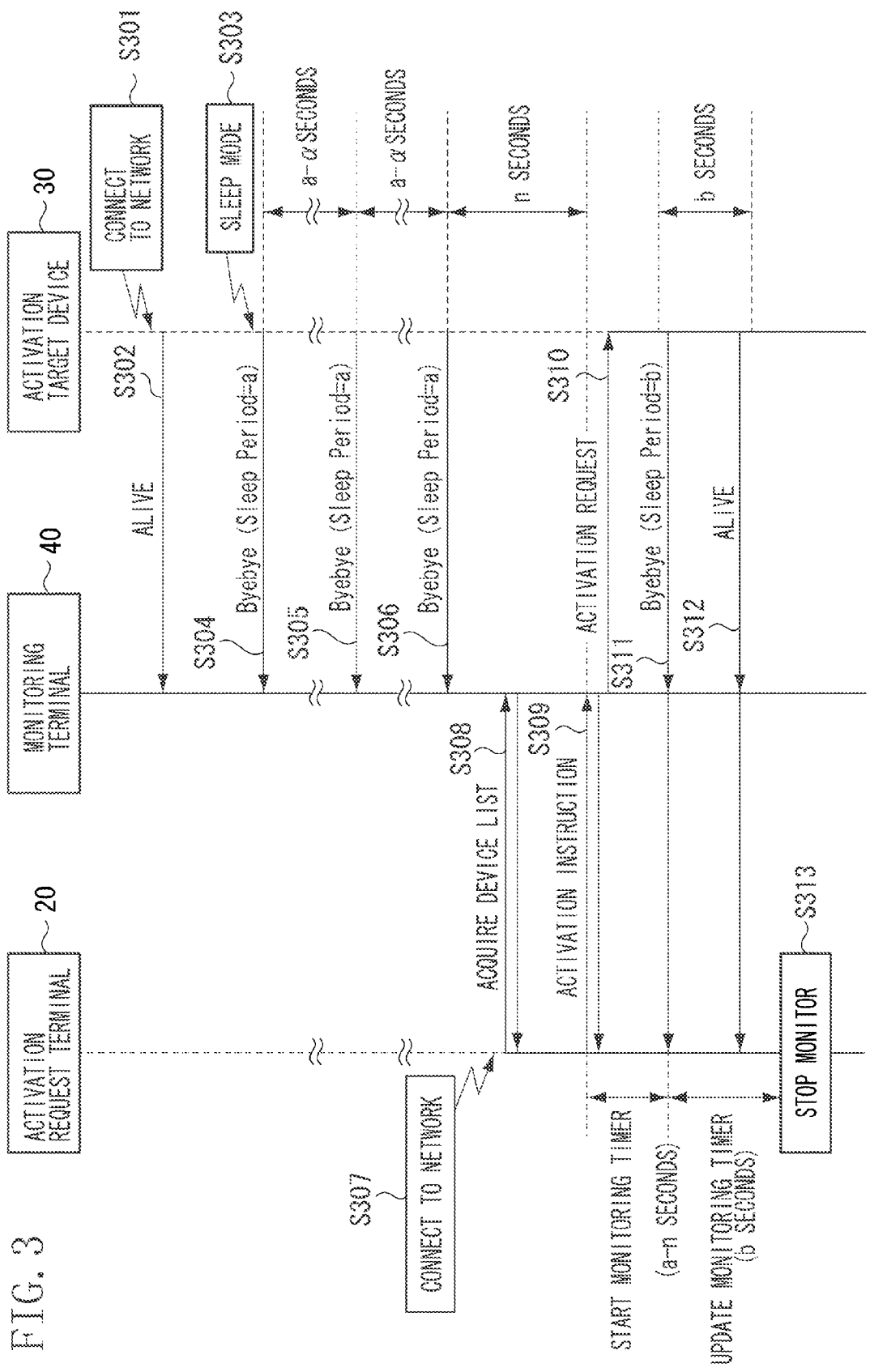

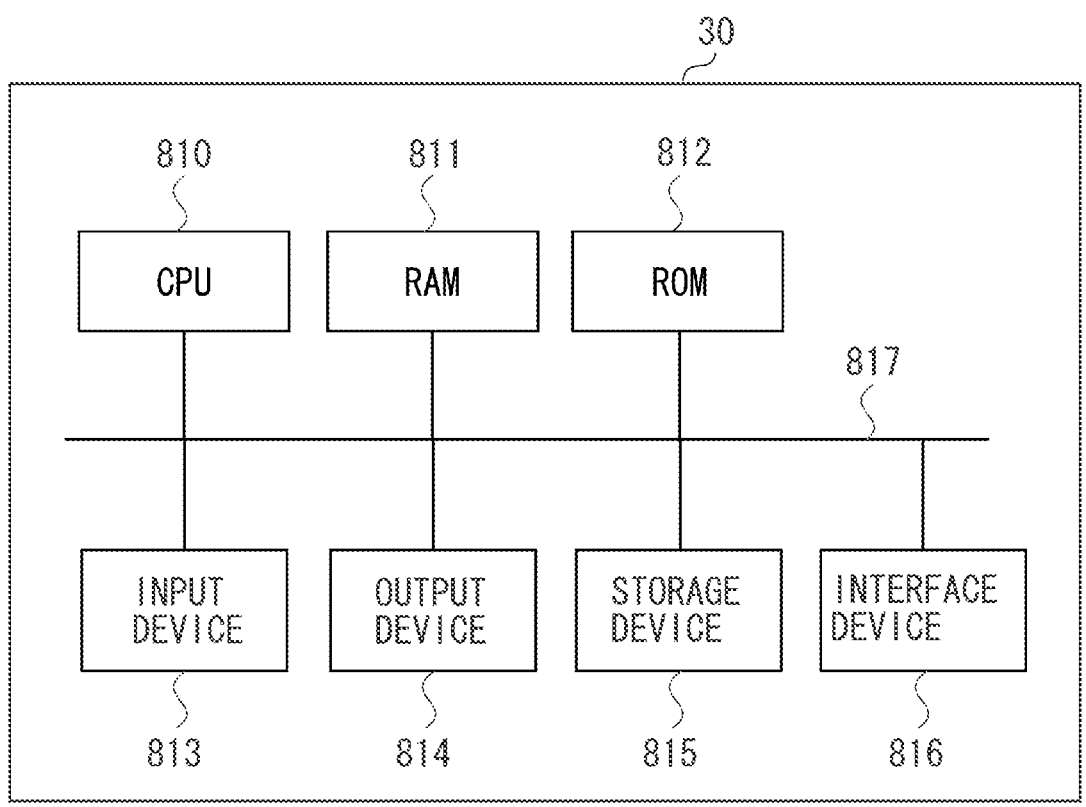

NETWORK DEVICE, INFORMATION PROCESSING APPARATUS, CONTROL METHOD OF THE SAME, AND RECORDING MEDIUM FOR THE SAME

BACKGROUND OF THE INVENTION

1. Field of the Invention

The present invention relates to a network device, an information processing apparatus, a control method of the same and a recording medium for the same.

2. Description of the Related Art

Recently, a public attention has been paid to well known communication standards such as universal plug and play (UPnP) in which a plurality of devices and information home electric appliances are connected to each other via a home network to share content data relating to still images, moving images and sound. These devices and information home electric appliances have a function of, when they are not in use in a certain period of time, being automatically turned into a power-off state or a sleep mode from viewpoints of energy saving. Further, these devices and information home electric appliances have a function of receiving an activation request via a network when they are in the power-off state or in the sleep mode, which is referred to as a wakeup-on-LAN function.

Accordingly, a user wants to utilize services provided by the network device by starting up the network device such as the above-described device and home information electric appliance in the power-off state or in the sleep mode, connected to a home network from remote places.

Japanese Patent Application Laid-Open No. 2005-175625 discusses a technique for storing a media access control (MAC) address which an activation request terminal operated by a user acquires from the network device and, when the user utilizes the service, selecting the MAC address of the network device that the user intends to activate.

Japanese Patent Application Laid-Open No. 2009-205267 discusses another technique in which an activation request terminal acquires in advance a time required for an application of a network device to turn into a stabilized state after the power is turned on and instructs the application to power on the network device prior to a reserved control startup time.

However, although, according to the technique discussed in Japanese Patent Application Laid-Open No. 2005-175625, the activation request terminal transmits the activation request to the network device, how long it will take until the network device is started cannot be known. Thus, in the technique according to Japanese Patent Application Laid-Open No. 2005-175625, it is necessary to monitor an activation completion message dispatched from the network device in a period until the network device is started and becomes capable of performing control. Because retrieval throughout the network needs to be repeated until a target network device is found out, if the network device fails to be started, the monitoring or retrieval is continued in vain, which is a problem to be solved.

According to Japanese Patent Application Laid-Open No. 2009-205267, by acquiring an activation time of the network device in advance, a time when the network device becomes capable of performing control after transmitting the activation request can be grasped.

However, a case can be assumed that the network device does not receive an activation request packet for the reason that the network device is not connected to the network. Further, it can be assumed that even if the network device succeeds to receive the activation request packet, the network device may fail to activate the application for some reason.

In such a case, according to the technique discussed in Japanese Patent Application Laid-Open No. 2009-205267, the activation request terminal cannot determine whether the activation of the network device fails or not.

SUMMARY OF THE INVENTION

One aspect of the present invention is directed to providing a system capable of determining whether a network device has been successfully activated.

According to an aspect of the present invention, a network device capable of communicating with an information processing apparatus via a network includes a receiving unit configured to receive an activation request from the information processing apparatus, an activation unit configured to activate at least one of hardware and software of the network device in response to the activation request received by the receiving unit, a notification unit configured to notify the information processing apparatus of a first scheduled time indicating a duration time of a state in which at least one of the hardware and the software of the network device is not activated, and a responding unit configured to notify, in response to the activation request received after the notification unit is notified of the first scheduled time, the information processing apparatus of a second scheduled time indicating a duration time of the state in which at least one of the hardware and the software of the network device is not activated between when the first scheduled time is notified and before a time corresponding to when the first scheduled time elapses, and when the activation has been completed, to notify the information processing apparatus that the activation has been completed.

According to another aspect of the present invention, an information processing apparatus capable of communicating with a network device via a network includes a request unit configured to request activation of at least one of hardware and software of the network device, a receiving unit configured to receive a notification of a first scheduled time for continuing a state in which the network device is not activated, a first response indicating a second scheduled time for continuing the state in which the network device is not activated in response to the request, and a second response providing notification that activation of the network device has been completed in response to the request, a first determining unit configured to, if either the first response or the second response is not received between when the notification of the first scheduled time is received and a time corresponding to the first scheduled time elapses as a response to the request the requesting unit made after receiving the notification, determine that the activation has been not executed, and a second determining unit configured to, if the second response is not received between when the first response is received and a time corresponding to the second scheduled time elapses after receiving the first response between when the notification of the first scheduled time is received and the time corresponding to the first scheduled time elapses as the response to the request the requesting unit made after receiving the notification, determine that the activation has not been executed.

According to exemplary embodiments of the present invention, a determination whether or not the network device has been activated can be appropriately made.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2A illustrates an Alive message that is an example of a Simple Service Discovery Protocol (SSDP) message.

FIG. 2B illustrates a Byebye message that is an example of the SSDP message.

FIG. 3 illustrates an example of a sequence in the communication system.

FIG. 8B illustrates an example of a hardware configuration of the activation target device.

DESCRIPTION OF THE EMBODIMENTS

Various exemplary embodiments, features, and aspects of the invention will be described in detail below with reference to the drawings.

Figure 1:
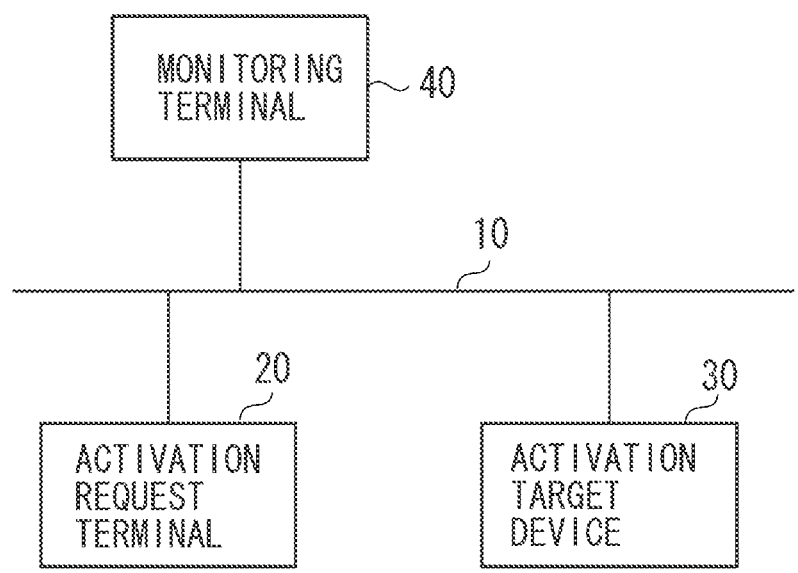
FIG. 1 illustrates an example of a configuration of a communication system according to an exemplary embodiment of the present invention.

FIG. 1 illustrates an example of a configuration of a communication system according to an exemplary embodiment of the present invention. The communication system includes an activation request terminal 20, an activation target device 30 and a monitoring terminal 40. The activation request terminal 20, the activation target device 30 and the monitoring terminal 40 are connected via a network 10 communicably with each other. The network 10 may be a wired local area network (LAN), a wireless LAN using Bluetooth or the like, or a combination of these.

The activation target device 30 is an example of a network device (computer), which is based on UPnP device architecture (DA) and UPnP low power service (LP). The activation target device 30 has a function capable of changing into an activation state when receiving an activation request from an external device when it is in a power-off state or a sleep mode.

The activation state described here refers to a state other than the power-off state and the sleep mode state, and more specifically, means that hardware used for a service provided by the activation target device 30 is activated such that it can provide the service.

In the meantime, although according to the present exemplary embodiment, the wakeup-on-LAN (WOL) is used as means for activating the activation target device 30, it is permissible to use other means than the WOL.

The monitoring terminal 40 is an example of an information processing apparatus (computer), and is based on the Proxy function of the LP to monitor the state of the activation target device 30. The monitoring terminal 40 monitors a Simple Service Discovery Protocol (SSDP) message sent to the network 10 in multicast transmission. By this monitoring, the monitoring terminal 40 grasps and manages the state of the activation target device 30 including the power-off state and the sleep mode.

The monitoring terminal 40 has a function of providing information about the activation target device 30 connected to the network 10 to meet a request from the activation request terminal 20. Further, the monitoring terminal 40 has a function of turning the activation target device 30 currently in the power-off state or in the sleep mode into the activation state, and in response to an activation instruction dispatched from the activation request terminal 20, transmits the activation request to the activation target device 30 to turn the activation target device 30 into the activation state.

The activation request terminal 20 can turn the activation target device 30 in the power-off state or the sleep mode into the activation state and then confirms whether the activation target device 30 is in a controllable state.

It is permissible to adopt a configuration that the activation request terminal 20 transmits an activation request to the activation target device 30 in the power-off state or the sleep mode. Further, it is also permissible to adopt a configuration that when the activation request terminal 20 instructs the monitoring terminal 40 to activate the activation target device (activation instruction), the monitoring terminal 40 requests the activation target device 30 to be activated. Further, it is also permissible to adopt a combination of these.

The activation request terminal 20 has a function of, after it transmits the activation request to the activation target device 30 or transmits the activation instruction to the monitoring terminal 40, monitoring to confirm whether the activation target device 30 is in the activation state. The activation request terminal 20 acquires information about the activation target device 30 connected to the network 10 from the monitoring terminal 40.

Although the present exemplary embodiment is described such that the activation request terminal 20 and the monitoring terminal 40 are physically independent terminals, they may exist together in a single apparatus. As described above, the activation target may be a physical apparatus (hardware), an application (software) in the apparatus, or a combination of both. In other words, in the present exemplary embodiment, at least any one of the hardware and the software may be regarded as the activation target.

For example, if the activation target is only an application (software), its activation state refers to states other than the state where the application has been terminated and the state where the application is stopped.

Next, the SSDP message which the activation target device 30 transmits to the network 10 in the multicast transmission will be described below with reference to FIGS. 2A and 2B.

FIG. 2A illustrates an Alive message 100 that is an example of the SSDP message. The Alive message 100, which is an example of the SSDP message, is transmitted cyclically after the activation target device 30 is connected to the network 10 and then activated. An item "ssdp:alive" 101 means that the activation target device 30 is currently in the activation state.

FIG. 2B illustrates a Byebye message 200, which is an example of the SSDP message. The Byebye message 200 is transmitted when the activation target device 30 is changed from the activation state to the power-off state or the sleep mode. An item "ssdp:byebye" 201 means that the activation target device 30 is not in the activation state.

An item "Powerstate:2" 202 is information indicating numerically that the activation target device 30 is in the power-off state or in the sleep mode, and this numeral is specified according to the LP. An item "SleepPeriod:120" 203 is an example of a scheduled time indicating a time when the activation target is scheduled to be activated, which is a time period (seconds) taken until the activation target turns into the activation state next time. In other words, this means that before the scheduled time elapses, the SSDP message is transmitted again. Thus, when the power-off state or the sleep-mode state is continued, this Byebye message 200 is transmitted again.

Next, a series of processing for the activation request terminal 20 to confirm the state of the activation target device 30 will be described with reference to FIG. 3. FIG. 3 illustrates an activation control method for the activation target device 30, in other words, an example of the sequence of the communication system.

In step S301, when the activation target device 30 is connected to the network 10, in step S302, the activation target device 30 multicasts the Alive message to the network 10. The monitoring terminal 40 monitors the multicast transmission of the SSDP message to the network 10 and receives the Alive message.

The monitoring terminal 40 may acquire Device/Service Description containing the device information of the activation target device 30 based on the received Alive message.

The device information includes a time when the SSDP message was received last time, an activation method and the like. The device information may be information specified on the UPnP standard or information expanded by a vendor. The monitoring terminal 40 may acquire the device information for turning the activation target device 30 from the power-off state or the sleep-mode state into the activation state from the activation target device 30 at an appropriate timing, and stores and manage the device information about the activation target device 30.

In step S303, the activation target device 30 regards a fact that, for example, no user operation is input in a specific period as a trigger, and in step S304, the activation target device 30 multicasts the Byebye message to the network 10. By receiving the Byebye message, the monitoring terminal 40 determines that the activation target device 30 has been changed into the sleep-mode state, and then, updates the state of the activation target device 30 contained in the device information of the activation target device 30 managed by the monitoring terminal 40.

In step S305, the activation target device 30 multicasts the Byebye message again "alpha" seconds prior to a time (e.g., "a" seconds: a=120) specified by the Sleep Period in the Byebye message elapses. After receiving the Byebye message again, the monitoring terminal 40 updates the state of the activation target device 30 like in step S304. In the meantime, when receiving the Byebye message, the monitoring terminal 40 stores the time specified by the Sleep Period, and every time when receiving the Byebye message, the monitoring terminal 40 overwrites the time specified by the Sleep Period and then stores it.

Unless the monitoring terminal 40 receives the Byebye message even if "a" seconds elapse after the processing in step S304 ends, the monitoring terminal 40 determines that the activation target device 30 is not connected to the network 10. If it is determined that the activation target device 30 is not connected, the monitoring terminal 40 may update or delete the device information of the activation target device 30.

The processing in step S306 is similar to that in step S305. If there is no change in the state of the activation target device 30, the Byebye message is multicast to the network 10 repeatedly.

On the other hand, in step S307, when the activation request terminal 20 is connected to the network 10, in step S308, the activation request terminal 20 acquires a device list containing the device information of the activation target device 30 connected to the network 10. In the meantime, when the activation target device 30 is in the activation state, the activation request terminal 20 can find out the activation target device 30 through retrieval by SSDP M-Search. On the other hand, when the activation target is not in the activation state, even if the activation request terminal 20 performs retrieval based on the SSDP M-Search, it cannot find out the activation target device 30.

The activation request terminal 20 turns the activation target device 30 into the activation state based on the acquired device information. The activation request terminal 20 dispatches an activation instruction about the activation target device 30 to the monitoring terminal 40, which will be described in detail below with reference to FIG. 4. Further, the activation request terminal 20 receives a response from the monitoring terminal 40 that received the activation instruction.

The activation request terminal 20 monitors the state of the activation target device 30 to confirm it. At this time, the activation request terminal 20 sets a monitoring timer for terminating the monitoring. The monitoring time ("a−n" seconds) can be calculated from the time specified by the Sleep Period (i.e., "a" seconds), which is an example of the scheduled time contained in the device information acquired from the monitoring terminal 40, and the time when the Byebye message was received last time. The time "n" is an elapsed time ("n" seconds: n<a) since the Byebye message was received last time.

Additionally, the activation request terminal 20 is not restricted to the configuration for acquiring the scheduled time from the activation target device 30. For example, the activation request terminal 20 may be configured to acquire the scheduled time from a storage device in the activation request terminal 20 and a storage device connected to the network 10.

If the activation request terminal 20 does not receive the Alive message or the Byebye message from the activation target device 30 in a short time after "a−n" seconds elapsed, the activation request terminal 20 terminates monitoring the activation target device 30. In other words, the activation request terminal 20 determines that it could not (failed to) turn the activation target device 30 into the activation state based on the termination of the monitoring.

In step S310, after receiving the activation instruction, the monitoring terminal 40 returns a response to the activation request terminal 20 and transmits the activation request to the activation target device 30. For example, the monitoring terminal 40 turns the activation target device 30 into the activation state using the MAC address which can be acquired from the SSDP message multicast by the activation target device 30.

On the other hand, in step S311, after receiving the activation request, the activation target device 30 executes processing for turning itself into the activation state, and at the same time, multicasts the Byebye message which specifies a time required to complete the processing ("b" seconds) in the Sleep Period. Upon receiving the Byebye message via the monitoring terminal 40, the activation request terminal 20 updates the monitoring timer to "b" seconds and continues the monitoring.

If the processing for turning itself into the activation state is completed, then in step S312, the activation target device 30 multicasts the Alive message.

When the activation request terminal 20 receives the Alive message via the monitoring terminal 40, in step S313, the activation request terminal 20 stops the monitoring timer and terminates the monitoring the activation target device 30. If the activation request terminal 20 does not receive the Alive message in a short time after "b" seconds elapsed, the activation request terminal 20 terminates monitoring of the activation target device 30. In other words, the activation request terminal 20 determines that the activation target device 30 failed to turn itself into the activation state based on the termination of the monitoring.

In the above example, the activation request terminal 20 transmits the activation request via the monitoring terminal 40. However, the activation request terminal 20 may transmit the activation request to the activation target device 30 based on the information of the activation method contained in the device information acquired from the monitoring terminal 40.

Figure 4:
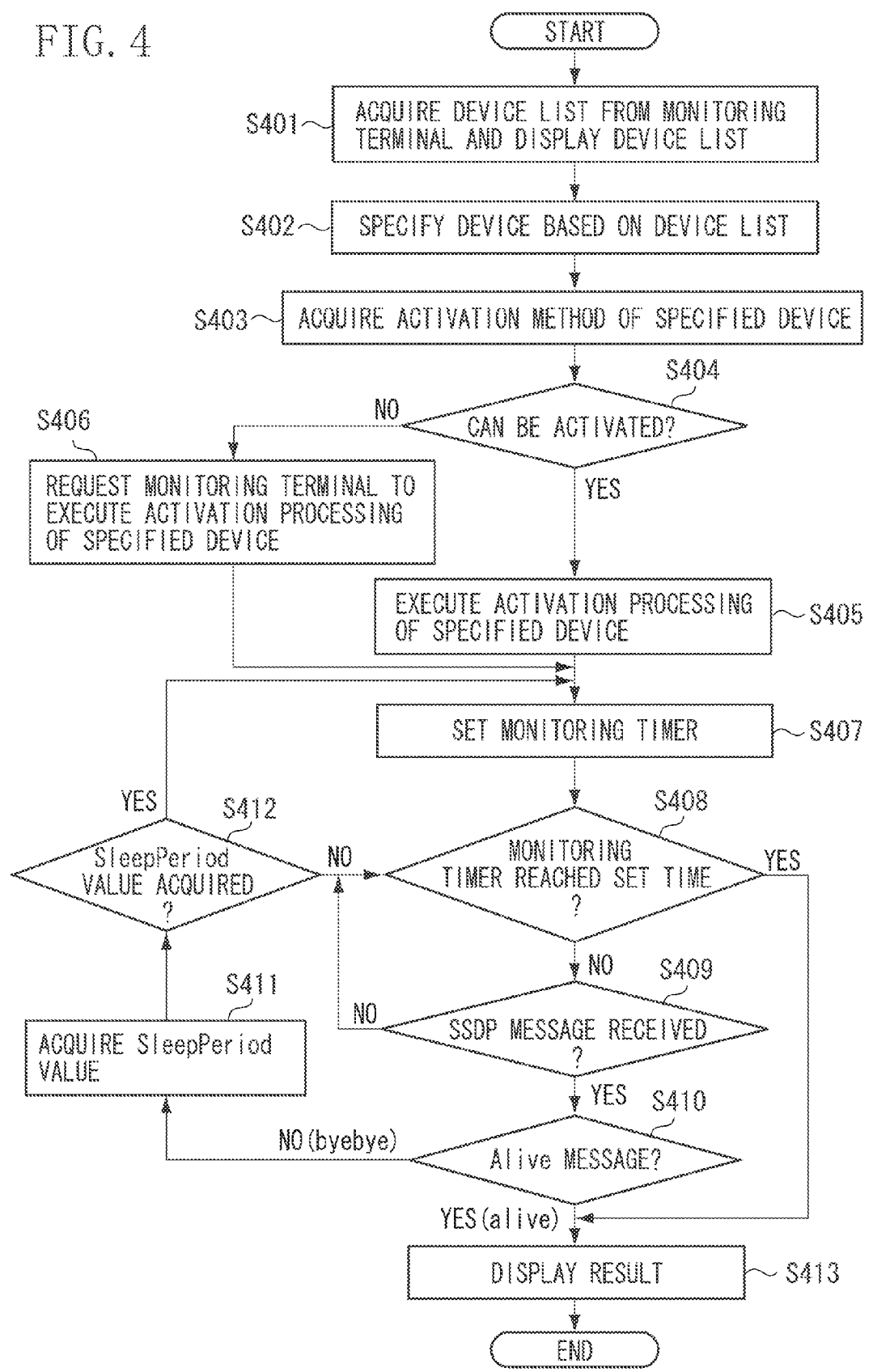
FIG. 4 illustrates an example of a flow chart for confirmation processing.

Next, a series of processing (confirmation processing) for confirming (monitoring) the state of the activation target device 30 after the activation request terminal 20 is connected to the network 10 will be described below with reference to FIG. 4. FIG. 4 illustrates an example of the flow chart of the confirmation processing.

In step S401, from the monitoring terminal 40 connected to the network 10, the activation request terminal 20 acquires a device list containing the device information of the activation target device 30 not in the activation state, and displays the acquired activation target device 30 on its display screen. If there is a plurality of the activation target devices 30 not in the activation state, the device information of each device is displayed as a list.

Subsequently, in step S402, the activation request terminal 20 specifies the activation target device 30, which a user specifies by operating an input device 713 described below, from the list of the activation target devices 30. Then, in step S403, the activation request terminal 20 acquires information about the activation method from the device information of the specified activation target device 30.

Subsequently, in step S404, the activation request terminal 20 determines whether the activation target device 30 can be activated according to the information about the acquired activation method. If the activation request terminal 20 determines that the activation target device 30 can be activated (YES in step S404), then in step S405, the activation request terminal 20 transmits the activation request (executes the activation processing) to the specified activation target device 30. On the other hand, if the activation request terminal 20 determines that the activation target device 30 cannot be activated (NO in step S404), in step S406, the activation request terminal 20 requests the monitoring terminal 40 to execute the activation processing of the activation target device 30 (transmit an activation instruction to the monitoring terminal 40).

Subsequently, after executing the activation processing or transmitting the activation instruction, in step S407, the activation request terminal 20 sets the monitoring timer, and advances the processing to step S408. The time to be specified in the monitoring timer is calculated from, for example, a time ("a" seconds) specified in the Sleep Period of the Byebye message that the activation target device 30 transmitted last time and a time when the activation request terminal 20 made the activation request or the activation instruction.

In step S408, the activation request terminal 20 determines whether the time set by the processing in step S407 has elapsed (whether the set monitoring timer has reached the set time). If the activation request terminal 20 determines that the monitoring timer has reached its set time (YES in step S413), the activation request terminal 20 terminates the monitoring and determines that the activation target device 30 failed to be turned into the activation state. Then, in step S413, the activation request terminal 20 displays a result indicating the failure on its screen. In the meantime, the activation request terminal 20 may terminate the confirmation processing without executing any processing (for example, without executing the processing in step S413).

On the other hand, if it is determined that the monitoring timer has not reached the set time (NO in step S408), the activation request terminal 20 continues to stand by for receiving the SSDP message. In other words, the activation request terminal 20 starts standing by for receiving the SSDP message to be multicast in order to confirm the state of the activation target device 30. In step S409, the activation request terminal 20 determines whether the SSDP message has been received via the monitoring terminal 40. If the activation request terminal 20 determines that the SSDP message has been received (YES in step S409), the activation request terminal 20 advances the processing to step S410. Whereas if it is determined that no SSDP message has been received (NO in step S409), the activation request terminal 20 returns the processing to step S408.

In step S410, the activation request terminal 20 determines which the SSDP message is the Alive message or the Byebye message.

At this time, if the activation request terminal 20 determines that the received SSDP message is the Alive message (YES (alive) in step S410), the activation request terminal 20 determines that the activation target device 30 has been changed into the activation state. Then in step S413, the activation request terminal 20 displays, for example, a result indicating a success on the screen. In the meantime, the activation request terminal 20 may terminate the confirmation processing without executing any processing (for example, without executing the processing in step S413).

On the other hand, if the activation request terminal 20 determines that the received SSDP message is the Byebye message (NO (byebye) in step S410), then in step S411, the activation request terminal 20 executes processing for acquiring the value of the Sleep Period from the Byebye message.

Subsequently, in step S412, the activation request terminal 20 determines whether the value of the Sleep Period has been received. If the activation request terminal 20 determines that it has received the value (YES in step S412), in step S407, the activation request terminal 20 resets the monitoring timer and continues the following processing. On the other hand, if it is determined that the activation request terminal 20 has not received the value (NO in step S412), in step S408, the activation request terminal 20 continues to stand by for receiving the SSDP message.

Figure 5:
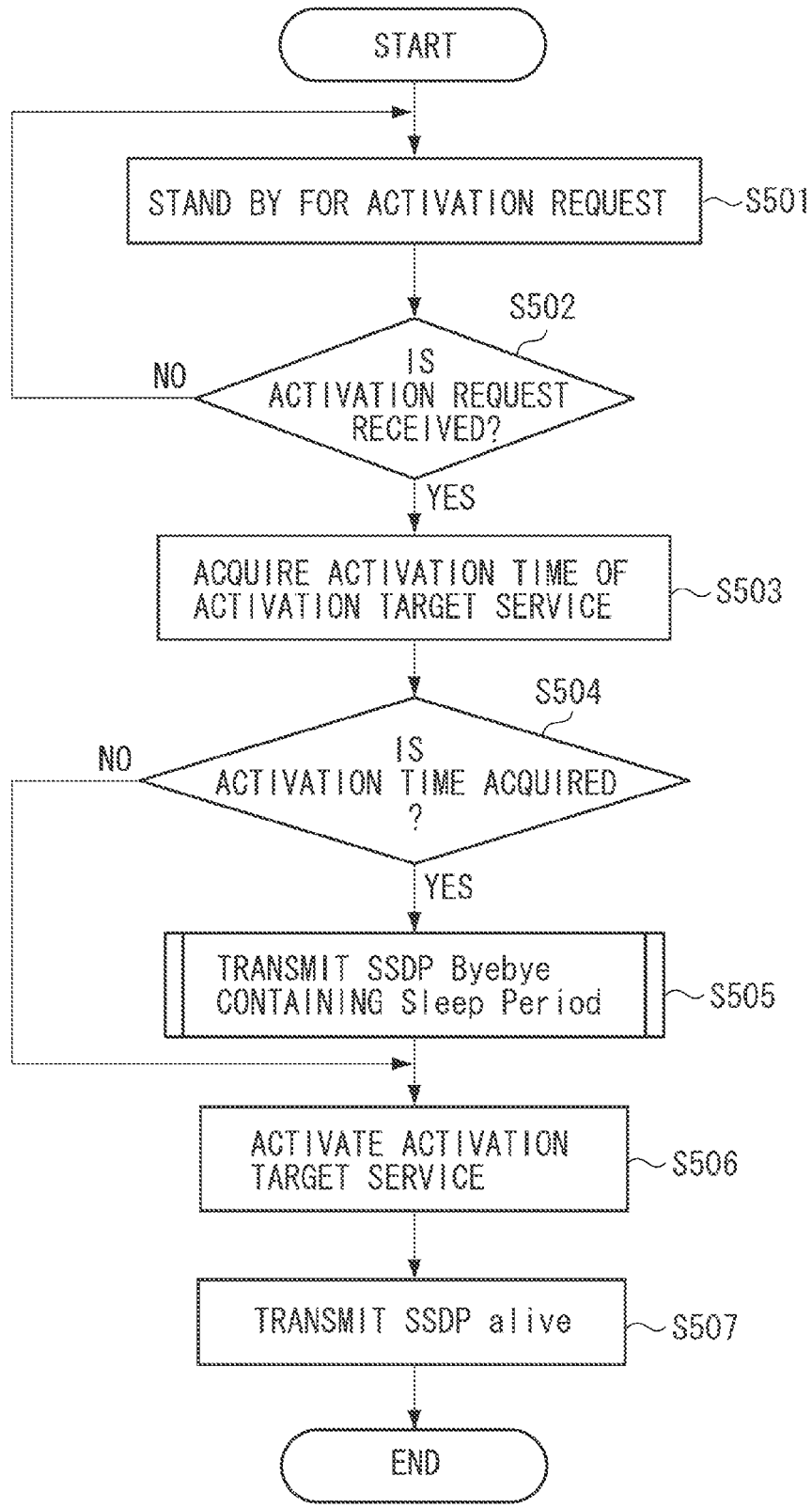
FIG. 5 illustrates an example of a flow chart for activation execution processing.

Next, activation execution processing which the activation target device 30 executes when it receives the activation request while the activation target device 30 is not in the activation state will be described with reference to FIG. 5. FIG. 5 illustrates an example of the flowchart concerning the activation execution processing.

In step S501, when the activation target device 30 stands by for the activation request, in step S502, the activation target device 30 determines whether the activation request has been received. If the activation target device 30 determines that it has received the activation request (YES in step S502), the activation target device 30 advances the processing to step S503. Whereas, if the activation target device 30 determines that it has no activation request received (NO in step S504), the activation request device 30 turns into the stand-by state for the activation request.

In step S503, the activation target device 30 executes processing for acquiring a time (activation time) required for changing into a predetermined activation state by taking into account an installation environment and a setting content of the activation target device 30, from a storage device 715 described below. The activation target device 30 may execute a processing of calculating the activation time by taking into account the installation environment and setting content.

In step S504, the activation target device 30 determines whether the activation time has been acquired. If the activation target device 30 determines that it has acquired the activation time (YES in step S504), the activation target device 30 advances the processing to step S505. On the other hand, if it is determined that the activation target device 30 has not acquired the activation time (NO in step S504), the activation target device 30 advances the processing to step S506.

In step S505, the activation target device 30 multicasts the Byebye message in which the acquired time is set in the Sleep Period, and then, the processing proceeds to step S506. The transmission processing will be described in detail below with reference to FIG. 6.

In step S506, the activation target device 30 activates the hardware, the software, or the both of them to be used in a service provided by the activation target device 30 (activation target service). For example, the activation target device 30 restarts supplying power to the device to which supply of power is restricted or restarts a halted application.

When the activation of all activation target services is completed, in step S507, the activation target device 30 multicasts the Alive message.

If a software piece for acquiring an activation time or a software piece for transmitting the Byebye message, described below, is not activated, the activation target device 30 activates those software pieces before executing each processing.

Figure 6:
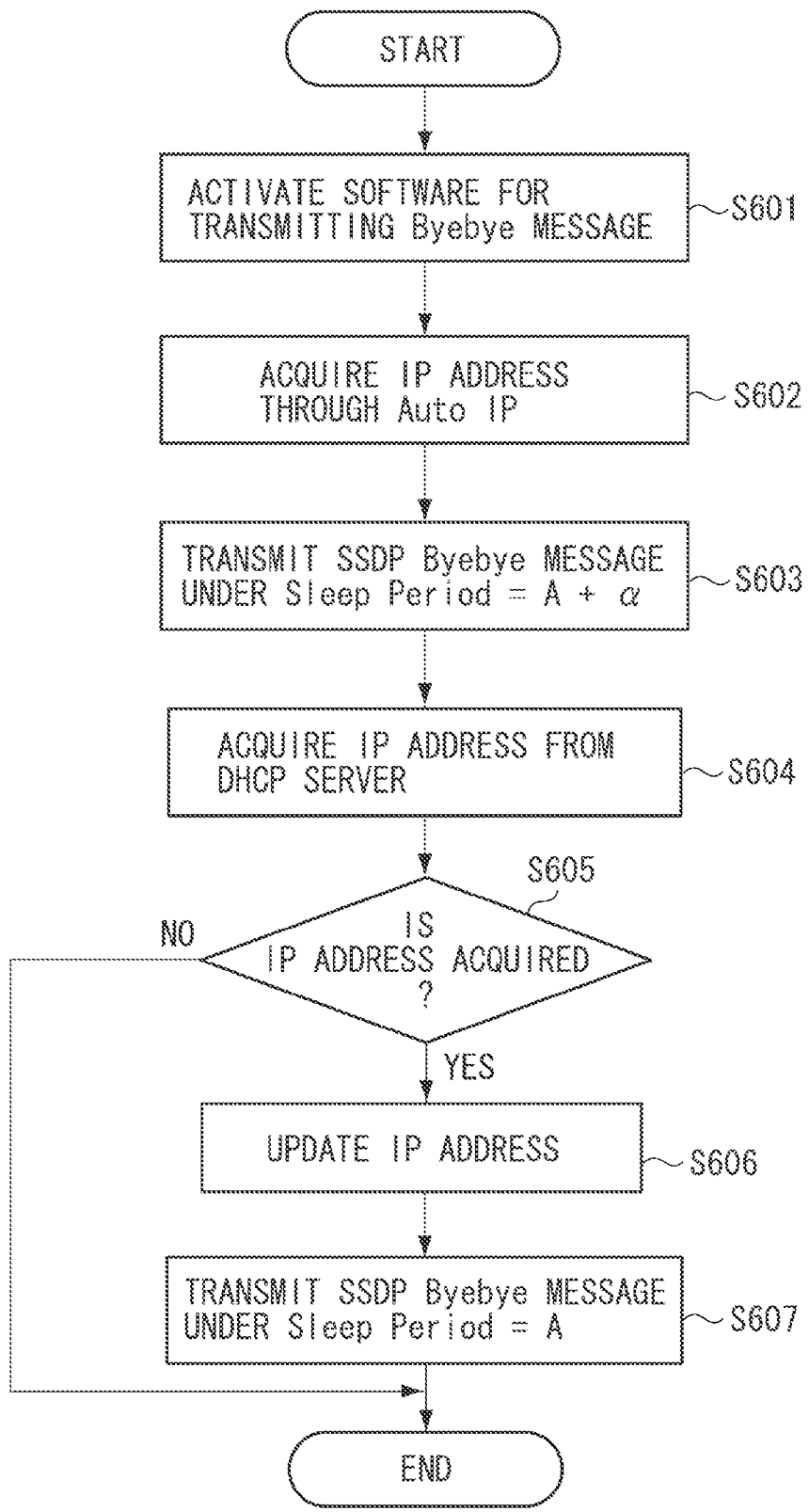
FIG. 6 illustrates an example of a flow chart for transmission processing.

Next, the transmission processing in step S505 in FIG. 5 will be described with reference to FIG. 6.

The activation time may differ depending on the installation environment of the activation target device 30 or the setting contents of the application. For example, as regards the setting of an Internet protocol (IP) address, a setting time of the IP address differs depending on which is selected a fixed mode or an automatic acquisition mode. Even if the automatic acquisition mode is selected, the acquisition method will be determined from a dynamic host configuration protocol (DHCP) method and an AutoIP method according to whether a DHCP server is provided as the installation environment, and consequently, a time required for acquiring the IP address differs.

Hereinafter, how to set the IP address will be described about a case of automatic setting of the IP address. FIG. 6 illustrates an example of the flow chart concerning the transmission processing.

First, in step S601, the activation target device 30 activates software for transmitting the Byebye message so that the activation target device 30 is turned into a state capable of transmitting the message. Subsequently, in step S602, the activation target device 30 acquires the IP address using the Auto IP.

In step S603, the activation target device 30 multicasts the Byebye message using the IP address acquired in step S602. At this time, a value (activation time) is set in the Sleep Period which is a time ("A" seconds) required for executing the processing in steps S506 to S507 in FIG. 5 plus an IP address acquisition timeout value ("alpha" seconds) with respect to the DHCP server. The "alpha" seconds is a time which elapses until a failure in acquisition of the IP address is detected (determined) when the activation target device 30 executes the IP address acquisition processing through the DHCP, while the network 10 contains no device having the function of the DHCP server.

In step S604, the activation target device 30 executes the processing for acquiring the IP address from the DHCP server, and in step S605, determines whether the IP address has been acquired successfully. If it is determined that the IP address has been acquired (YES in step S605), the activation target device 30 advances the processing to step S606. On the other hand, if it is determined that no IP address has been acquired (NO in step S605), the activation target device 30 returns the processing to step S506.

In step S606, the activation target device 30 updates the IP address. In step S607, the activation target device 30 multicasts the Byebye message in which the activation time ("A" seconds) required for executing the processing in steps S506 to S507 is set in the Sleep Period.

According to the above described processing, the activation target device 30 can notify the activation request terminal 20 of a difference in the activation time due to the installation environment of the activation target device 30. More specifically, although a number of factors which affect the activation time can be considered, the activation target device 30 may be configured to transmit a time which, when the activation is implemented up to a specified step, is required to activate remaining steps to the activation request terminal 20 as the activation time, and consequently, the problem that the activation time is uncertain can be solved.

Figure 7A:
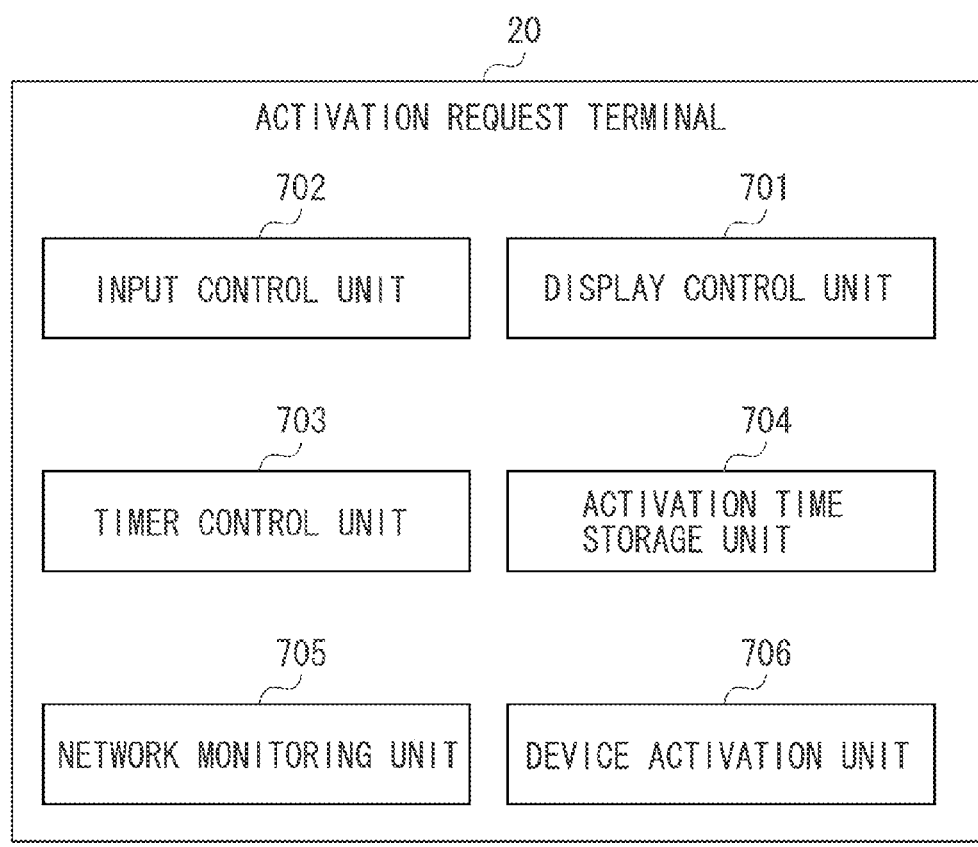
FIG. 7A illustrates an example of a functional configuration of an activation request terminal.
Figure 7B:
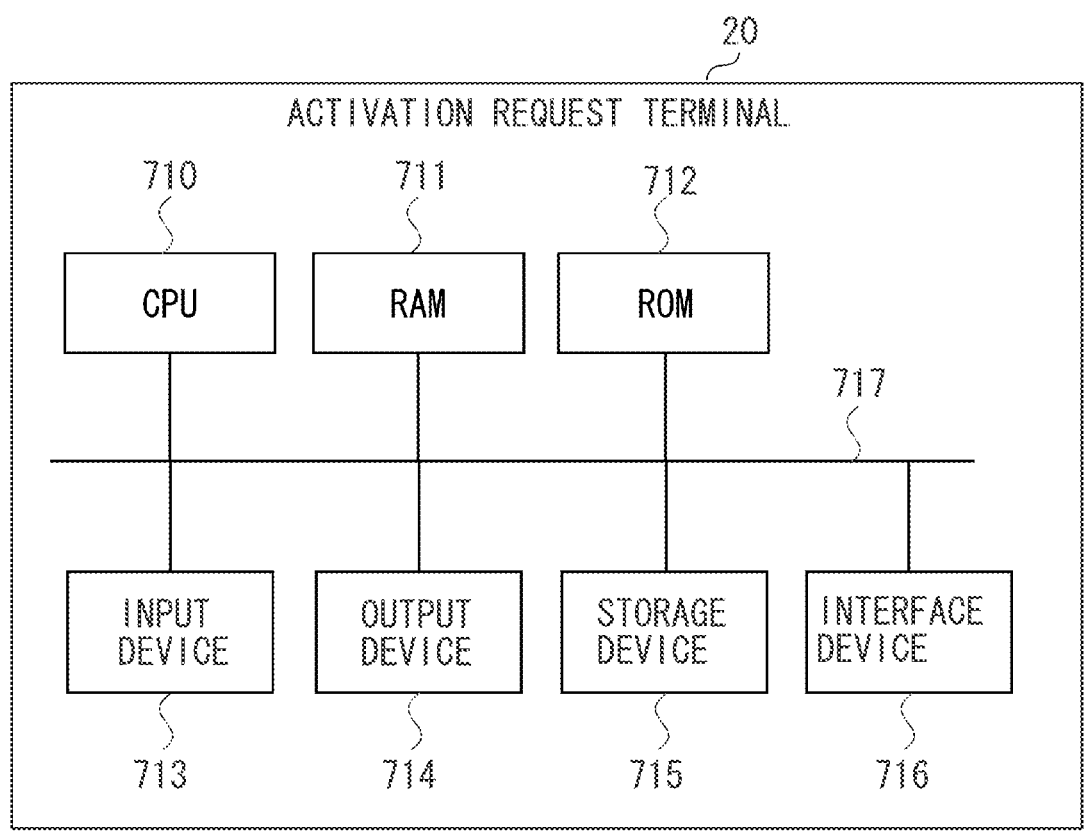
FIG. 7B illustrates an example of a hardware configuration of the activation request terminal.

Next, the functional configuration and the hardware configuration of the activation request terminal 20 will be described with reference to FIGS. 7A and 7B. FIG. 7A illustrates an example of the functional configuration of the activation request terminal 20. FIG. 7B illustrates an example of the hardware configuration of the activation request terminal 20.

The display control unit 701 displays a list of the activation target devices 30 and the monitoring terminals 40, device information, and the like on an output device 714, such as a liquid crystal display (LCD) incorporated in the activation request terminal 20 and a display unit located outside connected to the activation request terminal 20.

An input control unit 702 accepts a selection of a particular activation target device 30 which a user wants to activate from displayed plural activation target devices 30. Input can be accepted via a selection button contained in the activation request terminal 20, an input device 713 (external connecting device) such as a keyboard, and an input unit such as an external connecting device of the apparatus connected to the network 10 via an interface device 716.

A timer control unit 703 sets the monitoring timer according to a setting (registration, updating, etc.) requested from a network monitoring unit 705, and when the timer reaches its set time, the timer control unit 703 notifies the network monitoring unit 705 that the timer has reached the set time.

An activation time storage unit 704 stores a time required until the activation target is activated next time of each device in a storage unit of the storage device 715 according to the value of the Sleep Period contained in the Byebye message transmitted from the activation target device 30 or the device information received from the monitoring terminal 40.

The network monitoring unit 705 registers a monitoring timer in the timer control unit 703 based on the time required until the activation target is activated next time, which is acquired from the activation time storage unit 704. The network monitoring unit 705 further receives the SSDP message transmitted from the monitoring terminal 40 via the interface device 716, so that it receives the Alive message and the Byebye message of the activation target device 30. The network monitoring unit 705 receives the multicast SSDP message via the interface unit 716 and may receive the Alive message and the Byebye message from the activation target device 30.

When the network monitoring unit 705 receives the Alive message from the activation target device 30 or is notified that the timer reached the set time by the timer control unit 703, the network monitoring unit 705 stops monitoring of the network. The network monitoring unit 705 receives the Byebye message from the activation target device 30, and if the value of the Sleep Period is contained in the received Byebye message, the network monitoring unit 705 instructs the timer control unit 703 to update the monitoring timer.

A device activation unit 706 requests the activation target device 30 to be activated or instructs the monitoring terminal 40 to activate the activation target device 30.

According to the present exemplary embodiment, when a central processing unit (CPU) 710 executes processing according to the procedure of a program stored in a read only memory (ROM) 712 or the like, the function of the activation request terminal 20 and the processing illustrated in the flowcharts are realized. In the meantime, respective units 710 to 716 of the activation request terminal 20 are connected to each other communicably via a bus 717.

Figure 8A:
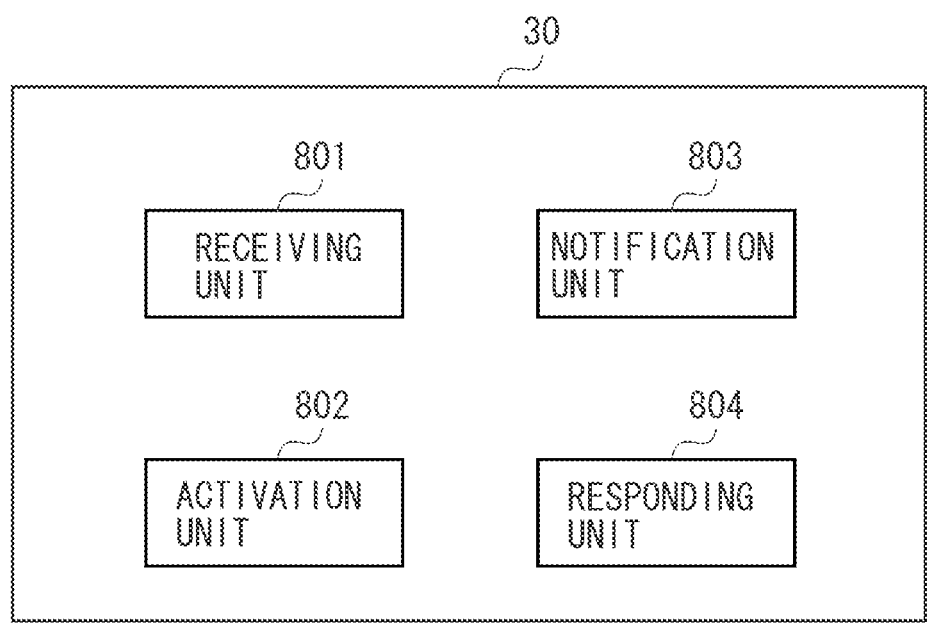
FIG. 8A illustrates an example of a functional configuration of an activation target device.

Next, the functional configuration and the hardware configuration of the activation target device 30 will be described with reference to FIGS. 8A and 8B. FIG. 8A illustrates an example of the functional configuration of the activation target device 30 and FIG. 8B illustrates an example of the hardware configuration of the activation target device 30.

Referring to FIG. 8A, a receiving unit 801 receives an activation request from the activation request terminal 20 via the monitoring terminal 40.

An activation unit 802 activates at least one of the hardware and the software of the network device in response to the activation request received by the receiving unit 801.

A notification unit 803 notifies the activation terminal 20 of a first Sleep Period (i.e., "a" seconds in the example illustrated in FIG. 3) which indicates a time when at least one of the hardware and the software of the activation target device 30 continues the state not to be activated, via the monitoring terminal 40. The "not-activated state" described here includes a state in which at least one of the hardware and the software of the activation target device 30 is in a sleep state which restricts the function thereof to reduce power consumption and a state in which the power of at least one of the hardware and the software of the activation target device 30 is turned off.

In response to the activation request received after the notification unit transmitted the notification of the first Sleep Period, a responding unit 804 notifies of a second Sleep Period (i.e., "b" seconds in the example illustrated in FIG. 3). The notification of the second Sleep Period is transmitted to the activation request terminal 20 via the monitoring terminal 40 before the notification of the first Sleep Period is transmitted and then the time corresponding to the first Sleep Period elapses.

The time corresponding to the first Sleep Period is a time for the activation request terminal 20 to wait for the second Sleep Period to be notified of, and does not need to be always the same time as the first Sleep Period. If the second Sleep Period is not notified within the time corresponding to the first Sleep Period, the activation request terminal 20 can determine that the activation request to the activation target device 30 has not been executed.

The second Sleep Period may be a time (i.e., "b" seconds in the example illustrated in FIG. 3) required for the activation target device 30 to be activated by the activation unit 802. If the activation request terminal 20 does not receive the message indicating that the activation of the activation target device 30 has been completed (i.e., Alive message in the example illustrated in FIG. 3) by the time when the time corresponding to the second Sleep Period elapses after receiving the second Sleep Period, the activation request terminal 20 can determine that the activation of the activation target device 30 has not been executed appropriately.

According to the present exemplary embodiment, a CPU 810 executes the processing according to the procedure of the program stored in a ROM 812 or the like, so that the function and the processing, which is illustrated in the flowchart, of the activation target device 30 can be achieved. In the meantime, the respective units (810 to 816) of the activation target device 30 are connected to each other communicably via a bus 817.

The monitoring terminal 40 includes similar hardware to the activation request terminal 20, and when the CPU executes processing according to the procedure of a program stored in the ROM or the like, the function and the processing, which is illustrated in the flowchart, of the monitoring terminal 40 can be achieved.

According to the present exemplary embodiment, the failure of the activation request to the activation target device due to disconnection from the network, an inability of activating the application or the like can be detected without applying any load on the activation request terminal and monitoring on the activation of the activation target device and retrieval of the activation target device can be terminated securely.

Aspects of the present invention can also be realized by a computer of a system or apparatus (or devices such as a CPU or a MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-031095 filed Feb. 16, 2011, which is hereby incorporated by reference herein in its entirety.

What is claimed is:

1. An information processing apparatus capable of communicating with a network device via a network, the information processing apparatus comprising:

a request unit configured to request activation of at least one of hardware and software of the network device;

a receiving unit configured to receive a notification of a first scheduled time for continuing a state in which the network device is not activated, a first response indicating a second scheduled time for continuing the state in which the network device is not activated in response to the request, and a second response providing notification that activation of the network device has been completed in response to the request;

a first determining unit configured to, if either the first response or the second response is not received between when the notification of the first scheduled time is received and a time corresponding to the first scheduled time elapses as a response to the request the requesting unit made after receiving the notification, determine that the activation has been not executed; and a second determining unit configured to, if the second response is not received between when the first response is received and a time corresponding to the second scheduled time elapses after receiving the first response between when the notification of the first scheduled time is received and the time corresponding to the first scheduled time elapses as the response to the request the requesting unit made after receiving the notification, determine that the activation has not been executed.

2. The information processing apparatus according to claim 1, wherein the receiving unit receives a time required for the activation as the second scheduled time in response to the request.

3. A method for controlling an information processing apparatus capable of communicating with a network device via a network, the method comprising:

receiving activation of at least one of hardware and software of the network device to be activated;

receiving a notification of a first scheduled time indicating a duration time of a state in which at least one of the hardware and the software of the network device is not activated, a first response indicating a second scheduled time indicating a duration time of the state in which at least one of the hardware and the software of the network device is not activated in response to the request, and a second response providing notification that the activation of the network device has been completed in response to the request;

determining, if either the first response or the second response is not received between when the notification of the first scheduled time is received and a time corresponding to the first scheduled time elapses as a response to the request made after receiving the notification, that the activation has been not executed; and determining, if the second response is not received between when the first response is received and a time corresponding to the second scheduled time elapses after receiving the first response between when the notification of the first scheduled time is received and the time corresponding to the first scheduled time elapses as the response to the request made after receiving the notification, that the activation has not been executed.

4. The method according to claim 3 further comprising receiving a time required for the activation as the second scheduled time in response to the request.

5. A non-transitory computer-readable medium that stores a program configured to cause a computer to execute a method for controlling a network device capable of communicating with an information processing apparatus via a network, the method comprising:

requesting activation of at least one of hardware and software of the network device to be activated;

receiving a notification of a first scheduled time for continuing a state in which the network device is not activated, a first response indicating a second scheduled time for continuing the state in which the network device is not activated in response to the request, and a second response providing notification that activation of the network device has been completed in response to the request;

determining, if either the first response or the second response is not received between when the notification of the first scheduled time is received and a time corresponding to the first scheduled time elapses as a response to the request made in the requesting procedure after receiving the notification, that the activation has been not executed; and determining, if the second response is not received between when the first response is received and a time corresponding to the second scheduled time elapses after receiving the first response between when the notification of the first scheduled time is received and the time corresponding to the first scheduled time elapses as the response to the request made in the requesting procedure after receiving the notification, that activation has not been executed.

6. The non-transitory computer-readable medium according to claim 5, further comprising receiving a time required for the activation as the second scheduled time in response to the request.

* * * * *